United States Patent [19]

Loo

[11] 4,357,305
[45] Nov. 2, 1982

[54] COAL GASIFICATION VESSEL

[75] Inventor: Billy W. Loo, Oakland, Calif.

[73] Assignee: The United States of America as represented by the United States Department of Energy, Washington, D.C.

[21] Appl. No.: 244,571

[22] Filed: Mar. 17, 1981

[51] Int. Cl.³ ............................................. B01J 19/02
[52] U.S. Cl. .................................... 422/241; 48/210; 422/109; 422/202; 422/240
[58] Field of Search ............... 422/202, 240, 241, 310, 422/109, 129; 423/323, 659, 447; 427/228; 261/DIG. 7; 48/210

[56] References Cited

U.S. PATENT DOCUMENTS

| | | | |
|---|---|---|---|
| 2,650,808 | 9/1953 | Cohen et al. | 261/DIG. 7 |
| 2,710,246 | 6/1955 | Marks et al. | 422/202 X |
| 2,772,860 | 12/1956 | Nelson | 422/241 X |
| 2,970,042 | 1/1961 | Lagerwey | 422/241 |
| 3,080,219 | 3/1963 | Harvey, Jr. | 422/109 X |
| 3,244,480 | 4/1966 | Johnson et al. | 422/241 X |
| 3,253,906 | 5/1966 | Secord | 423/323 X |
| 3,291,572 | 12/1966 | Fatica | 422/202 |
| 3,933,434 | 1/1976 | Matovich | 423/659 X |
| 3,936,535 | 2/1976 | Boder | 423/447 X |

Primary Examiner—Richard L. Chiesa

[57] ABSTRACT

A vessel system (10) comprises an outer shell (14) of carbon fibers held in a binder, a coolant circulation mechanism (16) and control mechanism (42) and an inner shell (46) comprised of a refractory material and is of light weight and capable of withstanding the extreme temperature and pressure environment of, for example, a coal gasification process. The control mechanism (42) can be computer controlled and can be used to monitor and modulate the coolant which is provided through the circulation mechanism (16) for cooling and protecting the carbon fiber and outer shell (14). The control mechanism (42) is also used to locate any isolated hot spots which may occur through the local disintegration of the inner refractory shell (46).

17 Claims, 6 Drawing Figures

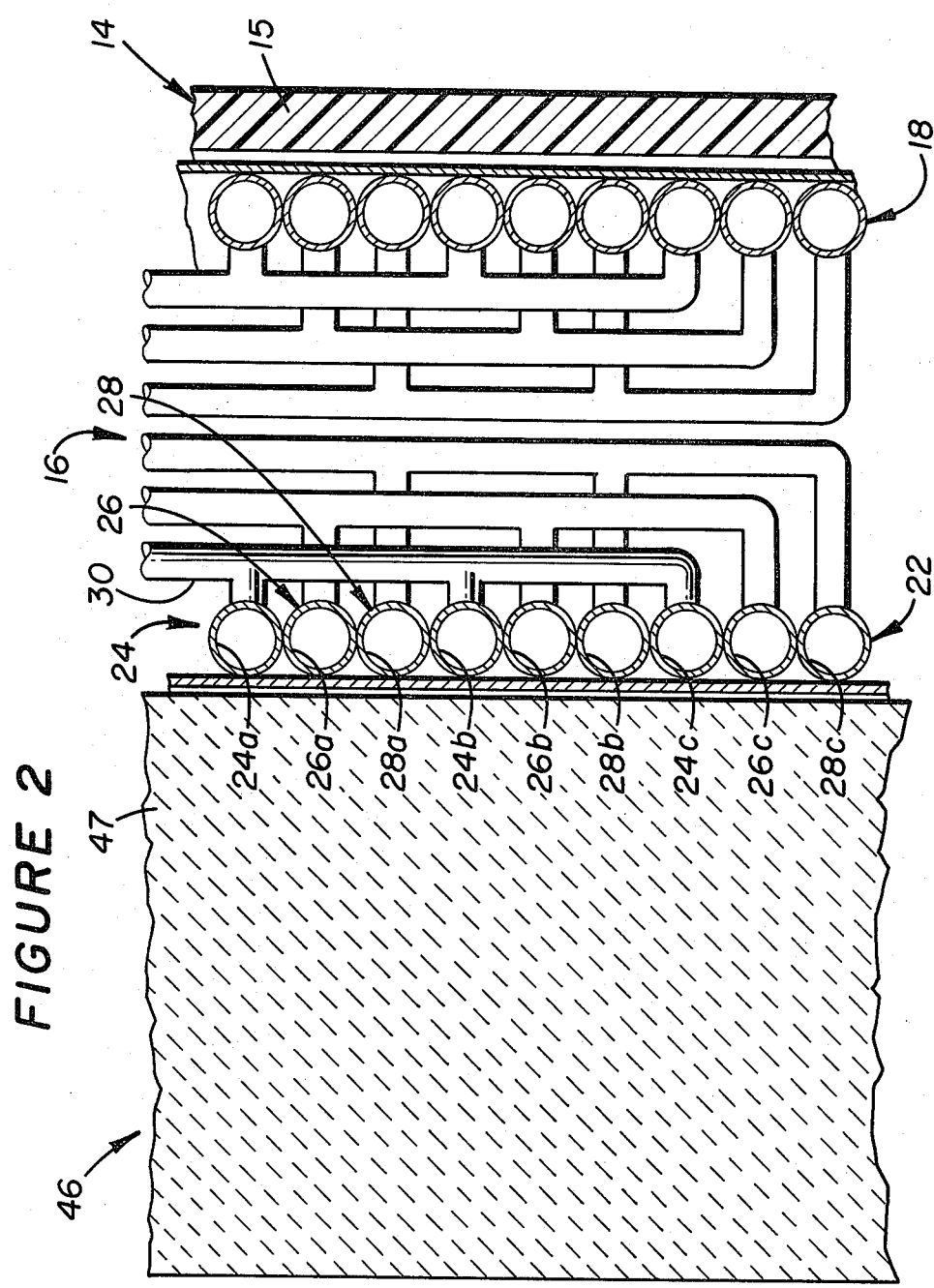

COAL GASIFICATION VESSEL

The United States Government has a right in this invention pursuant to a Contract No. W-7405-ENG-48 between the United States Department of Energy and the University of California.

BACKGROUND OF THE INVENTION

Technical Field

The present invention relates to reaction vessels, and in particular to a coal gasification vessel.

Gasification of coal to produce methane gas could provide a much needed replacement or supplement for dwindling supplies of natural gas. Unfortunately, the conversion of coal to gas occurs most economically at extremely severe conditions. These include a temperature of around 2500° F. (1370° C.), a pressure of about 1500 psi (100 atms) and in a very corrosive and abrasive atmosphere.

A projected typical size and shape for a conversion vessel is a cylinder approximately 30 feet (9.1 m) in diameter and 150 feet (45.7 m) long. To withstand the pressures required, the cylinder would be approximately 14 inches (35.5 cm) thick if the vessel were made of steel. Obviously, such a structure would be very heavy, very expensive and difficult to build, principally due to the difficulty in welding steel sections of such thickness and checking such welds for flaws. Such a structure would most probably be built on the site, since, due to its great size and weight, it would be quite difficult to move same.

It is known to use carbon fiber or graphite fiber in combination with resins used as binders to construct structures such as missile launching tubes. Such structures are many times lighter and easier to construct than similar structures comprised of steel and the like.

The conversion vessel would further include an interior shell of refractory material, such as refractory concrete, which would protect the steel vessel from the extreme heat of gasification reaction. Since the refractory material would gradually break down, with the development of a hot spot, the wall temperature must be monitored almost continually so that the refractory material can be replaced before the steel wall of the vessel is damaged. Monitoring by detecting infrared emission or by other methods from the outside of the vessel would be extremely difficult, since the auxiliary equipment necessarily surrounding the vessel would make access difficult. Further, the use of thermocouples and other point measuring devices would most likely not be satisfactory for monitoring temperature over an extended area, even if they could survive the hostile environment within the vessel.

It should also be noted that, along with monitoring the wall temperature, there may need to be provisions for cooling the wall or otherwise protecting the wall from the heat of the reaction. Cooling coils have been used in some vessel designs to provide coolant to protect the vessel wall.

It is an object of the present invention to provide a vessel for use in a high temperature, high pressure and corrosive environment which is found during the gasification of coal.

Another object of the present invention is to provide such a vessel which is relatively lightweight and easy to construct in comparison to the present state of the art.

Still another object of the present invention is to provide apparatus for the vessel which can not only cool the vessel but can monitor and locate high temperature spots which could be caused by, for example, a disintegration in the refractory material.

Still another object of the invention is to provide for safe operation of the vessel even though the refractory material thereof has disintegrated, until such time as it is safe to shut down the reaction in order to repair the refractory material.

Additional objects, advantages and novel features of the invention will be set forth in part in the description which follows, and in part will become apparent to those skilled in the art upon examination of the following, or will be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purpose of the present invention as embodied and broadly described herein, the vessel system of the invention which can be used in, for example, coal gasification, may comprise a vessel with an outer shell comprised of carbon fibers or graphite fibers held in a binder, a mechanism disposed inside said outer shell for circulating coolant, and an inner refractory shell disposed adjacent said coolant circulating mechanism. Also, the vessel system may comprise a control apparatus for adjusting the flow of coolant through said coolant circulating mechanism responsive to coolant temperature changes.

Further, the invention includes a method for locating an anomalous temperature in the above vessel, including the steps of providing a plurality of fluid carrying conduits adjacent the shells of said vessel, each conduit having an inlet and an outlet, measuring at least the outlet temperature of the fluid from each said conduit to identify one or more of the conduits as conducting fluid with an anomalous temperature, increasing the rate of flow of fluid in any conduit which has an anomalous temperature, and measuring the time required for the temperature to change in the conduit in which the flow rate was increased so as to locate the position of the anomalous temperature along the conduit.

Accordingly, it can be seen that the present invention has many advantages over the prior art. First, it can be seen that the combination of the above outer shell comprised of carbon or graphite fibers and the inner cooling apparatus provide for a vessel system which is much lighter than the existing steel structures but which can withstand the high temperatures and pressure environment as, for example, found in a coal gasification reaction. Another advantage of the present invention is that such a vessel is much easier to produce and test for flaws, and with increased size can be economically competitive with those made of steel and the like.

Still another advantage of the present system is that, should the refractory material disintegrate, the cooling apparatus could appropriately compensate and allow the vessel system to be run until it was safe and appropriate to shut down the reaction to repair the refractory material. Furthermore, since the cooling pipes are maintained at relatively low coolant temperature, they are much less susceptible to severe corrosion attacks which increase rapidly with elevated temperature.

Yet another advantage of the present invention is the ability to locate an anomalous temperature in the vessel and thus to locate and identify locations where the refractory material has disintegrated.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 2 depicts a schematical cross-sectional view (not to scale) of a portion of the walls of the vessel of the invention.

DETAILED DESCRIPTION OF THE INVENTION

Reference will now be made in detail to a presently preferred embodiment of the invention, an example of which is illustrated in the accompanying drawings.

Figure 1:
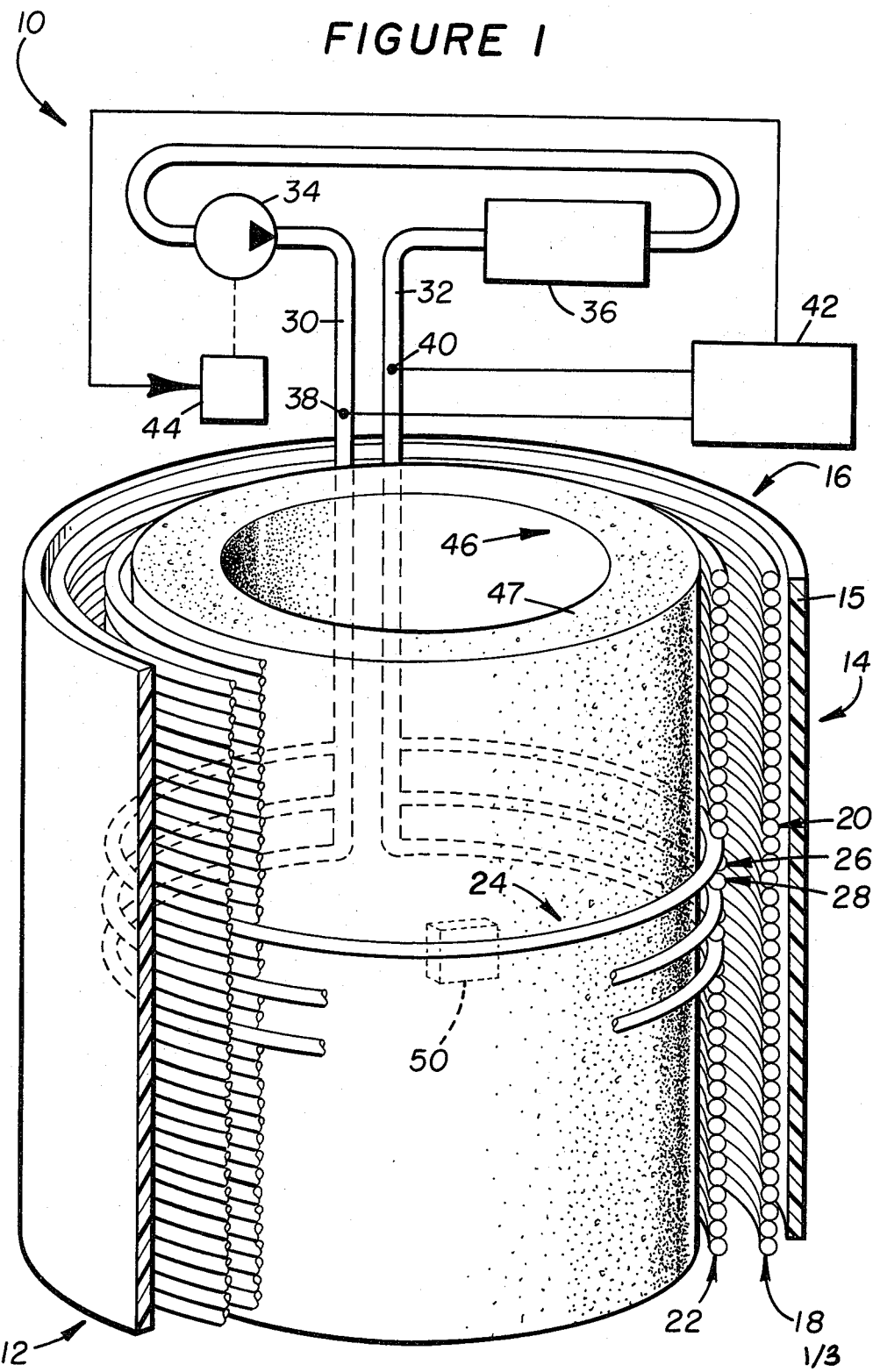
FIG. 1 shows a partially sectioned and partially cut away schematical perspective view (not to scale) of an embodiment of the vessel and peripheral equipment of the vessel system of the invention.

In FIG. 1, an embodiment of the vessel system of the invention is denoted by the numeral 10. Vessel system 10 includes a cylindrical and elongated vessel 12 which has an outer shell 14 which is comprised of carbon or graphite fiber in a woven or nonwoven form which is imbedded or held together by a binder material. The term "carbon fiber" shall be used hereinafter; however, it is to be understood that this term shall include graphite fibers and the like. One type of such material is designated "graphite AS/epoxy". In a preferred embodiment, the binder material is a commercially available, thermosetting epoxy resin. Further, in a preferred embodiment, the thickness of the wall 15 of the outer shell or wall 14 is approximately 5 inches (12.7 cm). This is sufficient to withstand the required pressure of approximately 1500 psi (100 atms.) Further, it is estimated that if the vessel were 150 feet long (45.7 m) and 30 feet (9.1 m) in diameter, the estimated weight would be 280 tons ($254 \times 10^3$ Kg) in comparison to a comparable steel vessel of the prior art, which would be approximately 4,107 tons ($3.7 \times 10^6$ Kg).

A coolant circulation means 16 is disposed inside said outer shell 14 and is used for circulating coolant. The coolant circulation means includes a first plurality of interleaved conduit sets, or outer coolant circulating means, 18 including individual conduit set 20 and a second similar plurality of interleaved conduit sets, or inner coolant circulating means, 22 including individual conduit set 24.

The innermost coolant circulating means, or second plurality of conduit sets 22, and in particular individual conduit set 24 thereof, will be described in greater detail; however, it is to be remembered that the optimization of conduit arrangement must be tailored specifically to a given reactor configuration, and that the first plurality of interleaved conduit sets 18 is similar in design. The second plurality of conduit sets 22 can be comprised of up to 100 conduit sets. In FIG. 2, three of such sets are depicted. They included the previously indicated set 24, and sets 26 and 28. Each of these sets includes three annular conduits which are disposed inside the outer shell 14 and which are interleaved with the annular conduits of the other conduit sets. It is noted that the annular conduits of set 24 are designated 24a, 24b and 24c, and the other annular conduits are designated 26a, 26b and 26c, and 28a, 28b and 28c. Each conduit set has an inlet manifold, such as inlet manifold 30 (FIG. 1) for conduit set 24, and an outlet manifold, such as outlet manifold 32 of conduit set 24. The flow rate in first conduit set 24 can be varied as required by pump 34, which communicates with inlet manifold 30. It is to be understood that similar pumps or fluid flow mechanisms can be associated with the inlet manifolds of the other conduit sets for the second plurality of conduit sets 22. Should any of the conduit sets fail, the adjacent interleaved conduit set could compensate by an increase in the flow of coolant therethrough. Further, it is to be noted that as the sets are interleaved a failure in any one set will not greatly interrupt the cooling effect in any region of the vessel. Coolant exiting the outlet manifold 32 would proceed through a cooler 36, which may be part of a system that provides cooling for all the conduit sets, before returning to the pump 34 in order to be recirculated through the conduits. The temperature of the coolant in the inlet and outlet manifolds 30 and 32 is measured as, for example, by thermocouples 38 and 40. These thermocouples are connected to a control means 42 which can adjust the flow of coolant through the coolant circulating means 16 responsive to the temperatures measured at thermocouples 38 and 40. Control means 42 has computer means and is connected to a plurality of servosystems, such as servosystem 44, which control the velocity and volume of coolant pumped from pump 34 into inlet manifold 30.

It is contemplated that the temperature of the inlet coolant will be approximately 20° C. and that the coolant will exit the exit manifold 40 at approximately 70° C. for a ΔT or temperature difference of 50° C.

The first plurality of control sets 18 can be used as a backup if, for instance, the entire second set should fail. In the alternative, a minimum of coolant can be sent through the first set to provide cooling for the vessel system 10, although it should be understood that the primary cooling is done by the second plurality of conduit sets 22.

An inner refractory shell 46 is disposed adjacent the coolant circulating means 16 and serves as a heat shield for means 16 and for the outer shell 14. The coal gasification reaction, for example, occurs within the cylindrical volume defined by the refractory shell 46. In preferred embodiment, the refractory shell 46 can be comprised of a cylindrical wall 47 of fired clay or a molded concrete refractory material.

The operation of the vessel system 10 is as follows. Under a normal, steady state operating condition for the vessel system 10, the refractory material 46 protects the coolant circulation means 16 and the outer shell 14 from the intense heat, which can reach upwards of 1370° C. The coolant circulation means 16 protects the outer shell 14 from any excess heat which penetrates the heat shield or refractory shield 46. In operation, the coolant, which can be water and the like, is pumped into the coolant circulation means 16 by pump 34 at approximately 20° C. and is heated by the reaction to approximately 70° C. for a change in temperature of 50° C. The development of a hot spot is indicated by an anomalous increase in the flow required to maintain a constant temperature difference ΔT between the inlet and outlet. An alternate mode of operation would be to maintain a constant coolant flow and to detect any anomalous increase in $\Delta T$ from its previously safe level.

It should be understood that the outer shell 14 bears the extremely high pressures of approximately 1500 psi (100 atms.) The refractory shell 46 and the coolant circulation means 16 are subjected on all sides to the extreme pressures.

The control means 42 constantly monitors the inlet and outlet temperatures in manifolds such as manifolds 38 and 40 of the one hundred or so conduit sets which make up each of the first and second plurality of conduit sets 18 and 22.

As noted above, during the operation of such vessel system 10, the refractory material has a tendency after a reasonable life to disintegrate due to the extreme corrosive and errosive environment that it is exposed to. When this occurs, it is important to both identify that such a disintegration is occurring and to locate the position and the size of the disintegration. Two coordinates, one a longitudinal coordinate and the other a circumferential or azimuthal coordinate, must be determined in order to find a point of disintegration or hot spot or abnormal temperature zone in the refractory shell 46. The longitudinal position is determined quite readily by the readings from the difference in the inlet and outlet manifolds 38 and 40. If, for example, the anomalous temperature or hot spot is located in area 50 (shown in dotted lines in FIG. 1), it can be understood that the temperature difference of the coolant in coolant set 24 and the adjacent set will increase and be measured by the control means 42. As the position of the coolant set 24 and the adjacent set are accurately known along the longitudinal length of the vessel 12, the longitudinal position of the hot spot is determined.

Figure 3A:
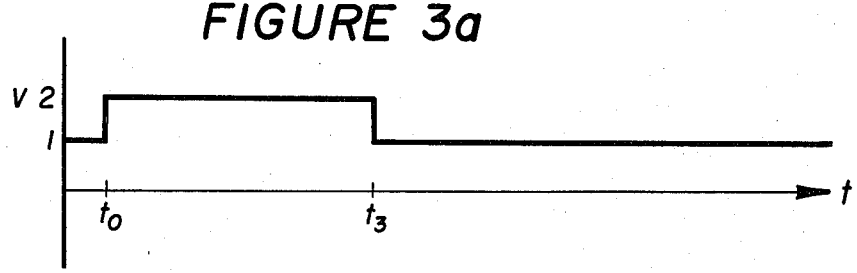
FIGS. 3a, 3b, 3c and 3d depict graphs of fluid velocity, changes in temperature, and the differentiations of changes in temperature vs. time vs. a time axis.
Figure 3B:
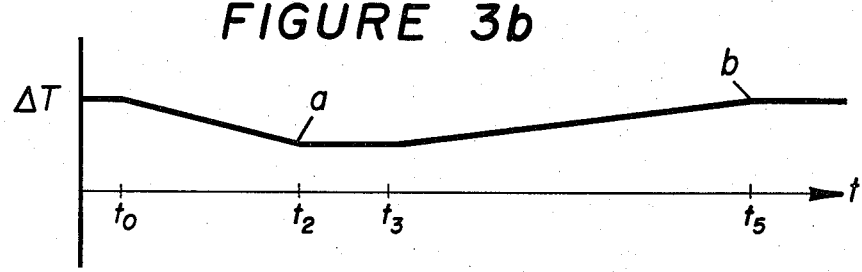

To determine the circumferential location, the velocity of coolant through the coolant set 24 and the adjacent set is modulated as follows. The velocity of the coolant through the coolant set 24 is increased, for example, by twofold at time $t_0$, although it should be understood that other multiples can be used. This increase is denoted in FIG. 3a in the velocity vs. time graph. Were there no hot spot in the vessel 12, the temperature difference, $\Delta T$, which is the difference between the temperature at the thermocouple 40 and the thermocouple 38, would drop as indicated by the solid lines in FIG. 3b. This figure shows that initially, as the velocity is doubled, the $\Delta T$ decreases to a steady state condition to "a" at time $t_2$. Obviously, when the flow rate is decreased to its normal rate at time $t_3$, the temperature would rise again as shown in that FIG. 3b at "b" (time $t_5$).

Figure 3C:
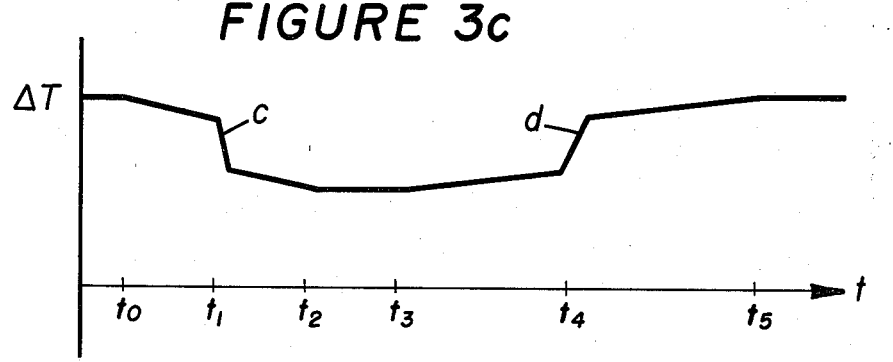
Figure 3D:
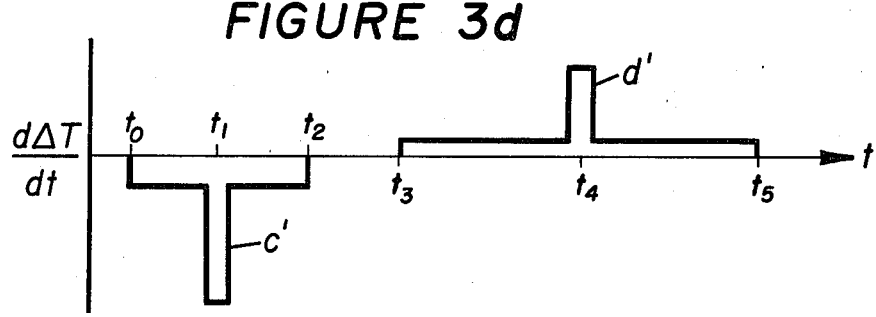

If a hot spot should occur, such as hot spot 50, there will be an increase in the temperature difference between thermocouples 40 and 38 (FIG. 3c). When the coolant is modulated to two times its normal flow rate, the rate of temperature drop in approaching a new equilibrium is proportional to the rate of heat input per unit length along the conduit. Thus, a hot spot would give rise to an abrupt change in the $\Delta T$ vs. t plot as indicated by "c" at time $t_1$ in FIG. 3C. The time it takes the coolant to complete the flow circuit from thermal couples 38 to 40 is $t_2-t_0$; therefore, the determination of $t_1$ is the same as locating the hot spot along the flow circuit. If the hot spot is closer to the inlet thermal couple 38, $t_1$ will be proportionally closer to $t_2$. Conversely, if the hot spot is near the end of the circuit, $t_1$ will be located close to $t_0$. Similar arguments apply to the situation when the flow returns to normal level at $t_3$ and the location of $t_4$ with respect to $t_3$ and $t_5$ will be used as a check for the hot spot's circumferential position as determined during the high flow period. For the sake of simplicity, the period of the test cycle $t_3$ should obviously be longer than the time it takes the coolant to complete the circuit. Further, it should be noted that, as seen in FIG. 3d, the exact location of a hot spot can be even more readily identified by differentiating the change in temperature over time as is shown for the high temperature condition of FIG. 3c. The spikes "c'" and "d'" (FIG. 3d) correspond to the signatures "c" and "c" in FIG. 3c.

It should be noted that, as a regular course of operation, the central location of these spikes may be pinpointed by additional mathematical techniques such as further differentiating FIG. 3d and locating the "zero crossing" points. The fluid through all the conduit sets can be modulated serially or in any other order as a check for hot spots.

From the above it can be determined that the vessel system 10 has many advantages over the prior art. First, it is noted that the vessel is lightweight, and relatively easy to construct, and that the integrity of the construction can be more readily tested than that of the prior art. Further, it is noted that the combination of the vessel system 10 allows the vessel 12 to withstand the extreme temperatures and pressures required for such a reaction. Further, the coolant circulation means 16 and the control means 42 not only cool the vessel system 10 but also provide a means for locating any disintegrations in the refractory shell 46 or other localized hot spots so that appropriate operating procedures such as shutting down the reaction or running the reaction until the hot spot becomes more critical can be instituted.

It should be emphasized that the safety aspects of this conceptual design, resulting from the redundancy in the cooling circuits and the inherent advantages of the carbon fiber composite in terms of its strength, light weight, fatigue resistance, creep resistance, corrosive resistance, dimensional stability and proven fabrication techniques, may well prove to be of paramount inportance.

The foregoing description of a preferred embodiment of the invention has been presented for purposes of illustration and description. It is not intended to be exhaustive, or to limit the invention to the precise form disclosed, and obviously many modifications and verifications are possible in light of the above teachings. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A vessel system capable of withstanding high temperatures and pressures comprising a plurality of shells:
   one of said plurality of shells constituting a closed, pressure containing outer shell comprised of carbon fiber held in a resin binder;
   means for cooling said outer shell which includes at least one separate cooling element disposed inside of and separate from said outer shell for circulating coolant; and
   another of said plurality of shells constituting an inner shell disposed radially within and separate from said cooling means, said inner shell being of refractory material to withstand high temperature and being in free and open pressure communication with all of said outer shell.

2. The vessel system of claim 1 including:
control means for adjusting the flow of coolant through said coolant circulating means responsive to coolant temperature changes.

3. The vessel system of claim 1 wherein said binder is thermosetting.

4. The vessel system of claim 1 wherein said binder is an epoxy resin.

5. The vessel system of claim 1 wherein the fibers are woven into a matrix.

6. The vessel system of claim 1 wherein the fibers are carbon fibers.

7. The vessel system of claim 2 wherein the coolant circulating means includes a plurality of interleaved conduit sets.

8. The vessel system of claim 7 wherein one of said conduit sets includes:
an inlet manifold;
an outlet manifold; and
at least a first conduit and a second conduit interconnecting the inlet and outlet manifolds and disposed adjacent the outer shell.

9. The vessel system of claim 8 wherein another of said conduit sets includes:
an inlet manifold;
an outlet manifold;
at least a first conduit and a second conduit interconnecting the inlet and the outlet manifolds and disposed adjacent the outer shell, said first conduit of said another set disposed between the first and second conduits of said one set and said second conduit of said one set disposed between the first and second conduits of said another set.

10. The vessel system of claim 7 including a second plurality of interleaved conduit sets.

11. The vessel system of claim 2 wherein said coolant circulating means has at least one inlet manifold and at least one outlet manifold and wherein said control means adjusts the flow of coolant responsive to the temperature difference between the coolant in the inlet and the outlet manifolds.

12. The vessel system of claim 1 wherein said control means includes means for locating an anomalous high temperature spot in said inner refractory shell.

13. The vessel system of claim 12 wherein said locating means includes:
means for measuring coolant temperature changes; and
means for varying the rate of flow of coolant through the circulating means.

14. The vessel system of claim 13 wherein the coolant circulating means has at least an inlet and an outlet manifold and wherein the measuring means measures the difference between the coolant temperatures in the inlet and the outlet manifolds.

15. A coal gasification vessel system comprising:
a closed, pressure containing outer shell comprised of carbon fibers held in a resin binder;
means separate from and substantially concentrically disposed inside of said outer shell and adjacent thereto for circulating a fluid to protect said outer shell from high temperature in the vessel system during coal gasification; and
an innermost temperature insulating wall of refractory material concentrically disposed within and located adjacent said fluid circulating means, said inner shell being in open and free pressure communication with substantially all of said outer shell.

16. The vessel system of claim 15 further including:
control means for adjusting the flow of fluid through said circulating means responsive to changes in the fluid temperature.

17. The vessel system of claim 15 including means for locating an anomalous temperature spot in said inner temperature insulating wall.

* * * * *